(12) United States Patent
Schuster

(10) Patent No.: US 9,348,672 B1
(45) Date of Patent: May 24, 2016

(54) SINGLETON COORDINATION IN AN ACTOR-BASED SYSTEM

(71) Applicant: Amazon Technologies, Inc., Seattle, WA (US)

(72) Inventor: Brian James Schuster, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/961,584

(22) Filed: Dec. 7, 2015

(51) Int. Cl.
   *G06F 3/00* (2006.01)
   *G06F 9/44* (2006.01)
   *G06F 9/46* (2006.01)
   *G06F 13/00* (2006.01)
   *G06F 9/54* (2006.01)
   *G06F 9/50* (2006.01)

(52) U.S. Cl.
   CPC .............. *G06F 9/542* (2013.01); *G06F 9/5011* (2013.01)

(58) Field of Classification Search
   None
   See application file for complete search history.

(56) References Cited

U.S. PATENT DOCUMENTS

| | | | | |
|---|---|---|---|---|
| 5,475,817 A | * | 12/1995 | Waldo | G06F 9/465 719/316 |
| 6,336,139 B1 | * | 1/2002 | Feridun | G06F 9/542 709/202 |
| 2013/0263131 A1 | * | 10/2013 | Beda, III | G06F 8/63 718/1 |

* cited by examiner

*Primary Examiner* — Craig Dorais
(74) *Attorney, Agent, or Firm* — Baker & Hostetler LLP

(57) ABSTRACT

Techniques for singleton coordination in an actor-based system are described herein. In some examples, one or more actors within an actor based system may be designated as singleton actors. Each singleton actor is permitted to have only a single associated instance in the actor-based system. In some cases, when multiple executing instances (i.e., duplicates) of a singleton actor are detected, the duplicates may be resolved, for example, such that no more than a single instance of the singleton actor is retained. In some examples, one or more singleton coordinators may be responsible for selecting one or more hubs on which to generate new or re-generated singletons, monitoring existing singletons to ensure that they continue to execute, and re-generating existing singletons after termination.

20 Claims, 11 Drawing Sheets

SINGLETON COORDINATION IN AN ACTOR-BASED SYSTEM

BACKGROUND

In some cases, it may be advantageous to perform computing operations using an actor-based model in which multiple actors execute on multiple hubs within a computing system, and individual actors receive and respond to various messages. In some examples, actors may sometimes be employed to perform operations associated with graphical objects in video games and other electronic media, operations associated with electronic mail, web services, and other operations. Also, in some cases, it may be advantageous to have a single instance of a given actor in the actor-based system, which is referred to hereinafter as a singleton actor. For example, it may sometimes be advantageous to have a singleton actor for cases in which it is simpler to implement an actor's associated functionality using a single actor than in a more distributed fashion. However, the coordination of singleton actors in an actor-based system may present a number of challenges. For example, basic realities of distributed systems (e.g., lost messages, network partitioning, etc.) will inevitably result in duplicate live actors. Additionally, actors and hubs may often be terminated, sometimes unexpectedly, therefore making it difficult to ensure that an instance of a particular singleton actor continues to execute in the system at any given time.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
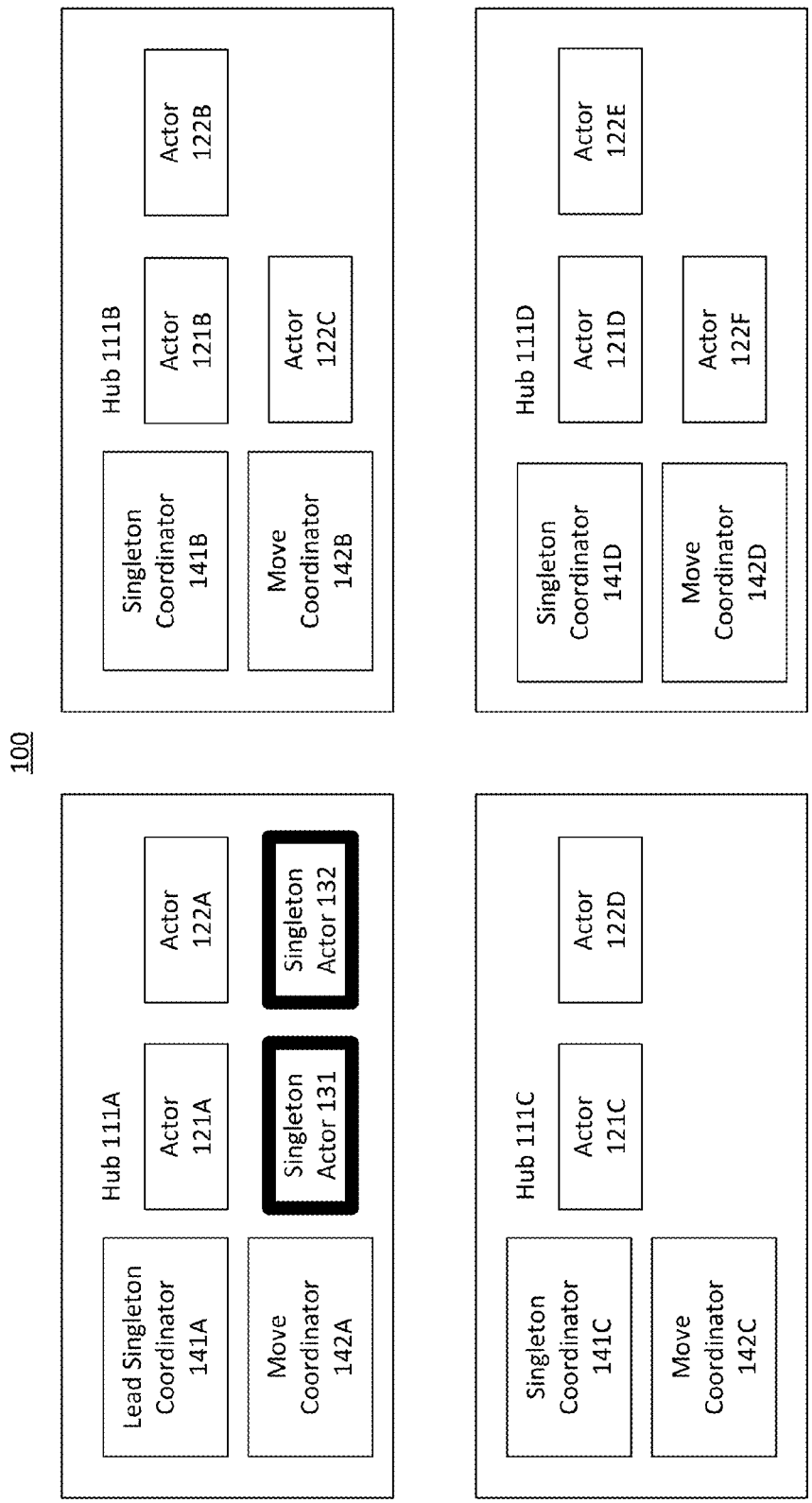
FIG. 1 is a diagram illustrating an example actor-based system with singleton actors that may be used in accordance with the present disclosure.

Techniques for singleton coordination in an actor-based system are described herein. In some examples, the actor-based system may include a plurality of actors executing on a plurality of hubs. The actors may be, for example, computational units that may be capable of maintaining state. For example, actors may receive and respond to various messages and may also send messages to other actors. Actors may, for example, change state in response to receiving of messages. In some examples, actors may be capable of performing various operations concurrently or partially concurrently with other actors. As set forth above, in some examples, actors may sometimes be employed to perform operations associated with graphical objects in video games and other electronic media, operations associated with electronic mail, web services, and other operations.

In some examples, one or more actors within the actor based system may be designated as singleton actors. Each singleton actor is permitted to have only a single associated instance in the actor-based system. Thus, in some examples, functionality associated with a singleton actor may be performed by only a single executing instance within the actor-based system. The techniques described herein may allow efficient coordination of singleton actors by performing various operations within the actor-based system. Some of these operations may include, for example, selecting one or more hubs on which to generate singleton actors, monitoring of singleton actors to ensure that they continue to execute in the actor-based system, detecting and resolving duplicates of singleton actors, and many other associated operations.

In some examples, all singleton actors may be generated during launching of the actor-based system on a single selected hub, such as a first hub to initiate execution within the actor-based system. Generating all singletons during launch on a single selected hub may sometimes be advantageous, for example, due to its simplicity and ease of implementation. However, generating singletons in this manner without a more complex coordination framework may also be problematic, for example, because it may not allow for generation of singletons after launch and may also not allow singletons to be re-generated when the selected hub unexpectedly terminates. For these and other reasons, a singleton coordinator framework (or other coordination framework) may sometimes be employed. In some examples, in the singleton coordinator framework, each hub may generate and maintain a respective singleton coordinator actor. Also, in some examples, one of the singleton coordinators may be designated as a lead singleton coordinator. For example, in some cases, the lead singleton coordinator may sometimes be designated by acquiring an associated lead coordinator lock within a database. In some examples, the lead singleton coordinator may be responsible for selecting one or more hubs on which to generate new or re-generated singletons, monitoring existing singletons to ensure that they continue to execute, and re-generating existing singletons after termination. In some cases, when a lead singleton coordinator is terminated, another singleton coordinator on another hub may assume the designation as the lead singleton coordinator, such as by acquiring an associated singleton coordinator lock within a database.

Furthermore, in some cases, duplicates of a singleton actor may sometimes be detected. For example, a first duplicate of the singleton actor may be detected on a first hub and a second duplicate of the singleton actor may be detected on a second hub. In some examples, first information associated with a state of the singleton actor maintained by the first duplicate may be identified. Additionally, second information associated with the state of the singleton actor maintained by the second duplicate may be identified. It may then be determined which of the first and second duplicate actors will be retained and which will be terminated. A resulting state of the singleton actor may also be determined. In particular, the retained and terminated actors as well as the resulting state may be determined, based at least in part, on the first information, the second information, and a set of one or more duplicate resolution priorities. In some examples, the duplicate resolution priorities may include determining the retained actor and/or its resulting state based on factors such as a time, sequence, quantity, or frequency of updates of the states of the first and/or the second duplicates, the time or sequence of generation of the first and/or the second duplicates, state values of the first and/or the second duplicates, and other factors.

FIG. 1 is a diagram illustrating an example actor-based system with singleton actors that may be used in accordance with the present disclosure. As shown in FIG. 1, actor-based system 100 includes actors 121A-D, 122A-F, 131 and 132 executing on hubs 111A-D. As set forth above, these actors may be, for example, computational units that may be capable of maintaining state. As also set forth above, the actors may, for example, receive and respond to various messages, send messages to other actors, and change state in response to receiving of messages. In some examples, the actors may be capable of performing various operations concurrently or partially concurrently with other actors.

Actors 131 and 132 are singleton actors. As set forth above, each singleton actor 131 and 132 is permitted to have only a single associated instance in the actor-based system 100. Thus, in some examples, functionality associated with a singleton actor may be performed by only a single executing instance within the actor-based system. As will be described below, in some cases, singleton actors may be moved from one hub to another or may be terminated and subsequently re-generated. However, only a single instance of a singleton actor is permitted to execute at any given time, such that multiple instances of a singleton actor are not permitted to execute concurrently with one another. As will also be described below, in some cases, when multiple executing instances (i.e., duplicates) of a singleton actor are detected, the duplicates may be resolved, for example, such that no more than a single instance of the singleton actor is retained.

By contrast, actors 121A-D, 122A-F are non-singleton actors. These non-singleton actors are permitted (but are not necessarily required) to have multiple associated instances within the actor-based system. For example, actors 121A-D are four instances of an associated actor 121. Additionally, actors 122A-F are six instances of an associated actor 122.

In some examples, it may be advantageous to designate an actor as a singleton actor for cases in which it is simpler to implement the actor's associated functionality using a single actor than in a more distributed fashion. Additionally, in some examples, it may be advantageous to designate an actor as a singleton actor for cases in which resource requirements (e.g. messages sent/received, processing time, memory use, etc.) of the actor remain well bounded when the system is scaled to large sizes, such as systems serving large numbers of players or other users. Furthermore, in some examples, it may be advantageous to designate an actor as a singleton actor for cases in which is acceptable for the actor to be temporarily terminated for a short interval before fault tolerance mechanisms restore it.

One particular example of when it may be advantageous to designate an actor as a singleton is in the case of a world manager actor, which may, for example, divide a virtual world into various regions and spawn region manager actors for those regions. In some examples, the world manager may be a singleton actor and the region managers may be non-singleton actors. In some examples, each region manager may maintain information regarding all players in its respective region. In one particular example, a player may detonate a charge in the region that the player is in. The player may wish to update other players in that region to reflect that they've been damaged. An example flow for this process is shown below:

1. Player→WorldManager: GetRegionManager(x, y)
2. WorldManager→Player: SendRegionQueryResults(x, y, regionManager)
3. Player→RegionManager: GetPlayersInRegion( )
4. RegionManager→Player: SendPlayerQueryResults(players)
5. Player→other Players: ApplyDamage(explosion)

In the above flow, a first message is sent from the player to the world manager to identify a region manager for the player's position (x, y). A second message is then sent from the world manager to the player identifying the region manager for the player's position. A third message is then sent from the player to the identified region manager to identify the players in the respective region. A fourth message is then sent from the region manager to the player identifying the players in the respective region. A fifth message is then sent from the player to the other identified players to apply damage resulting from the explosion.

Referring back to FIG. 1, hubs 111A-D maybe, for example, compute nodes and/or devices on which the actors 121A-D, 122A-F, 131 and 132 may execute. Thus, in some examples, one or more compute nodes and/or devices may perform any or all of the operations and include any or all of the features attributed herein to hubs 111A-D. In some examples, hubs 111A-D may each include a respective registry that includes, for example, address and other information for communicating with the actors in the actor-based system 100. In some examples, each registry may include information for communicating with local actors (i.e., actors that execute locally on the hub). Also, in some examples, a registry may also include information for communicating with certain remote actors (i.e., actors that execute on other hubs) for cases in which the hub has been provided with such information. In some examples, hubs may receive information for communicating with remote actors in a variety of ways, such as through communications with other hubs, through an epidemic or other protocol for spreading information across hubs, or in various other ways.

As also shown in FIG. 1, hubs 111A-D each include a respective singleton coordinator 141A-D and move coordinator 142A-D. In some examples, singleton coordinators 141A-D and move coordinators 142A-D may themselves be actors. Singleton coordinators 141A-D generally perform various operations related to coordination of singleton actors across actor-based system 100. These operations may include, for example, generation of singleton actors, hub selection for singleton actors, duplicate detection and resolution for singleton actors, monitoring and detection of terminated singleton actors, and re-generation of singleton actors. Each of these operations will be described in detail below. Singleton coordinator 141A is a lead singleton coordinator, which, as also described in detail below, may perform a leadership and/or supervisory role in any or all of the singleton coordination operations. Move coordinators 142A-D may generally perform various operations related to coordination of movement actors between hubs 111A-D. As will be described in detail below, move coordinators 142A-D may also perform various operations related to duplicate resolution for singleton actors within actor-based system 100.

As set forth above, in some examples, singleton coordinators 141A-D may be employed to perform various singleton coordination operations. It is noted, however, that the use of singleton coordinators 141A-D is merely one example technique for allowing singleton coordination and that various other approaches may also be employed. For example, in some cases, techniques may be employed in which all singletons are generated during launching of the actor-based system on a single selected hub, such as a first hub to initiate execution within the actor-based system. Generating all singletons during launch on a single selected hub may sometimes allow (though does not require) the actor-based system to be operated without the use of singleton coordinators 141A-D. However, generating singletons in this manner without a more complex coordination framework may also be problematic, for example, because it may not allow for generation of singletons after launch and may also not allow singletons to be re-generated when the selected hub unexpectedly terminates. For these and other reasons, a singleton coordinator or other coordination framework may sometimes be employed and implemented such as described in detail below.

In some examples, actors within the actor-based system 100 may occasionally be moved from one hub to another. A singleton actor may move hubs for a variety of different reasons. In one example, a singleton may move hubs for load balancing purposes. For example, if a singleton is executing on a first hub that is substantially less utilized than a second hub, then the singleton may sometimes be moved from the first hub to the second hub in order to more closely even out hub utilization. In another example, a singleton may move hubs when it is determined that a hub or machine in which the singleton is executing is being taken out of service, such as when the hub or machine is not functioning properly or an operating system or other component is being upgraded. In yet another example, a singleton may move hubs when it is determined that most actors interacting with the singleton are on a different hub than the singleton and that performance may be improved by moving the singleton to be co-located with the other actors on the different hub.

Figure 2:
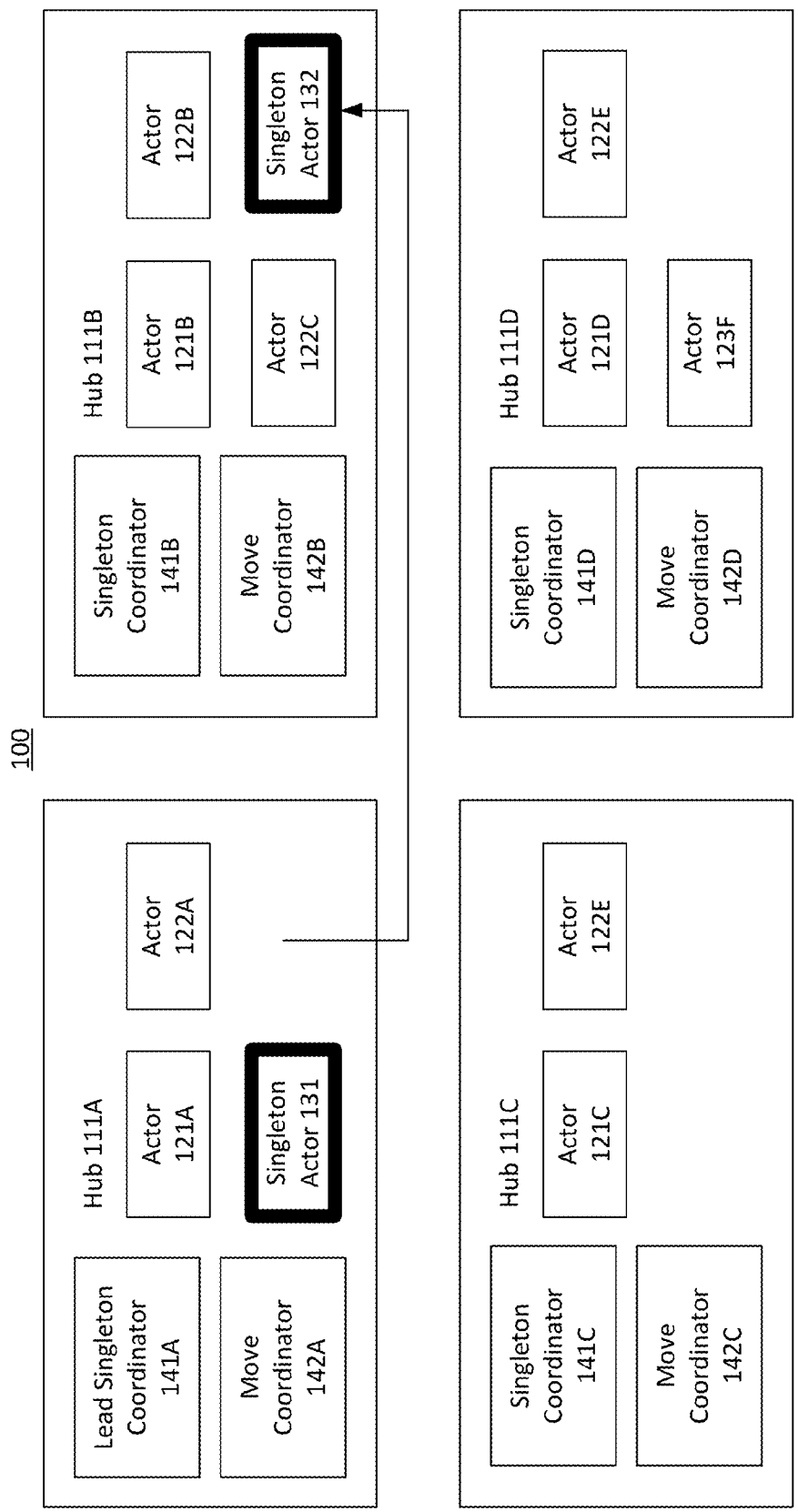
FIG. 2 is a diagram illustrating an example actor-based system with a moved singleton actor that may be used in accordance with the present disclosure.

FIG. 2 illustrates an example in which singleton actor 132 moves from hub 111A to hub 111B. In particular, referring back to FIG. 1, it can be seen that singleton actor 132 was first generated on hub 111A. However, as shown in FIG. 2, singleton actor 132 has moved from hub 111A to hub 111B, as shown by the line and arrow starting at the old location of singleton actor 132 on hub 111A and pointing to the new location of singleton actor 132 on hub 111B. As shown in FIG. 2, singleton actor 132 is removed from execution at its prior location at hub 111A.

Figure 3:
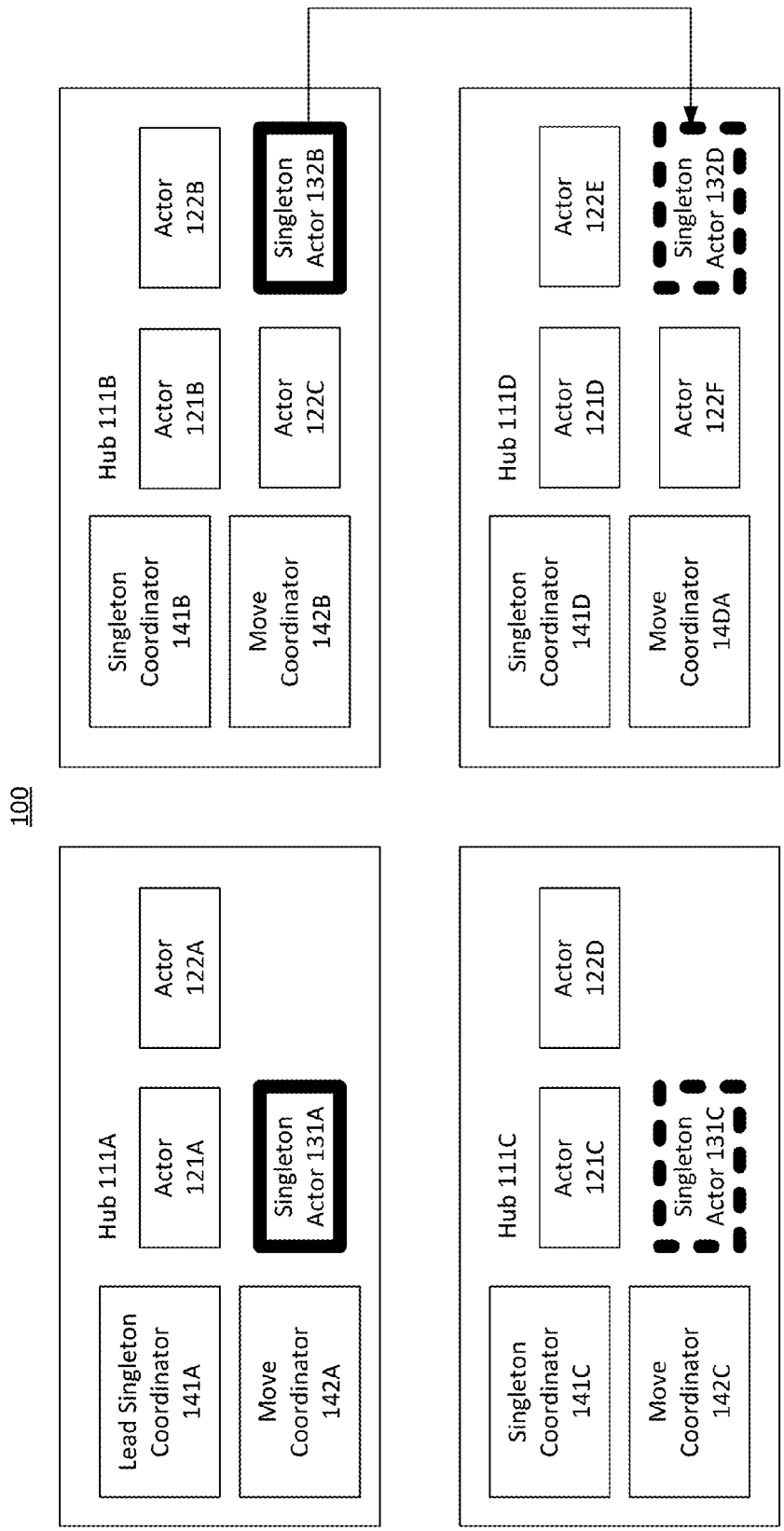
FIG. 3 is a diagram illustrating an example actor-based system with duplicated singleton actors that may be used in accordance with the present disclosure.

FIG. 3 illustrates another example in which singleton actor 132 is subsequently moved to another hub. In particular, as shown in FIG. 3, singleton actor 132 has moved from hub 111B to hub 111D, as shown by the line and arrow starting at the old location of singleton actor 132 on hub 111B and pointing to the new location of singleton actor 132 on hub 111D. In the example of FIG. 3, however, singleton actor 132 is not properly removed from its prior location at hub 111B. Instead, singleton actor 132 continues to execute on hub 111B, for example due to an error condition or other problem associated with the movement of singleton actor 132. Thus, in the example of FIG. 3, the failed movement of singleton actor 132 has resulted in a duplication of singleton 132, including duplicate 132B on hub 111B and duplicate 132D on hub 111D. Duplicate 132D is shown in FIG. 3 using a dashed line because it is more recently generated than duplicate 132B.

Thus, FIG. 3 illustrates an example failed singleton actor movement, which is one example scenario that may sometimes result in improper duplication of singleton actors. The failed actor movement of FIG. 3 results from an improper failure to remove the singleton actor 132 from hub 111B. This failure may be caused by a variety of conditions, such as lost messages, a network event (e.g., partitioning), and others. For example, in some cases, actor movement may be implemented using a set of messages. In particular, a first message may be sent from the source (e.g., hub 110B in FIG. 3) to the destination (e.g., hub 110D in FIG. 3) to request acceptance of the actor being moved. A second message may then be sent from the destination to the source to confirm acceptance of the actor being moved. A third message may then be sent from the source to the destination to commit the move operation. In some examples, if the third message is never received on the destination, then the destination may error on the side of assuming the move was approved and keep its copy of the actor. This may help to prevent a potential scenario where the actor was not retained on either the source or the destination, and the actor was lost entirely. Additionally, in some examples, if the source does not receive the second message described above (i.e., to confirm acceptance of the actor by the destination), then the source may also error on the side of not losing the actor entirely and keeping the source copy of the actor.

In some examples, each instance of an actor in the actor-based system 100 may be assigned a unique identifier that enables the individual instance to be efficiently identified and tracked in the actor-based system 100. It is noted that, in the example of FIG. 3, both duplicates 132B and 132D may, in some cases, include the same unique identifier because they result from failed movement of a single actor. For these reasons, the improper singleton duplicates resulting from a failed actor movement, such as duplicates 132B and 132D, may sometimes be referred to as physical duplicates.

It is noted however, that physical duplicates, such as duplicates resulting from failed actor movement, are merely one example type of singleton duplicates and that other types of scenarios may sometimes result in improper duplication of singletons. For example, multiple different instances of a singleton may sometimes be independently generated on multiple different hubs, which may sometimes be referred to as logical duplication of singleton actors. An example of logical duplication of a singleton actor is also shown in FIG. 3. In particular, in FIG. 3, it can be seen that singleton actor 131A on hub 111A and singleton actor 131C on hub 111C are logical duplicates of singleton actor 131. Duplicate 131C is shown in FIG. 3 using a dashed line because it is more recently generated than duplicate 131A. Unlike the arrow pointing from singleton actor 132B to singleton actor 132D (which indicates a singleton actor movement), there is no arrow connecting singleton actors 131A and 131C, which indicates that singleton actors 131A and 131C are logical duplicates that occurred from independent generation as opposed to failed actor movement. In some examples, unlike physical duplicates that may have the same unique identifier, logical duplicates may have different unique identifiers.

Figure 4:
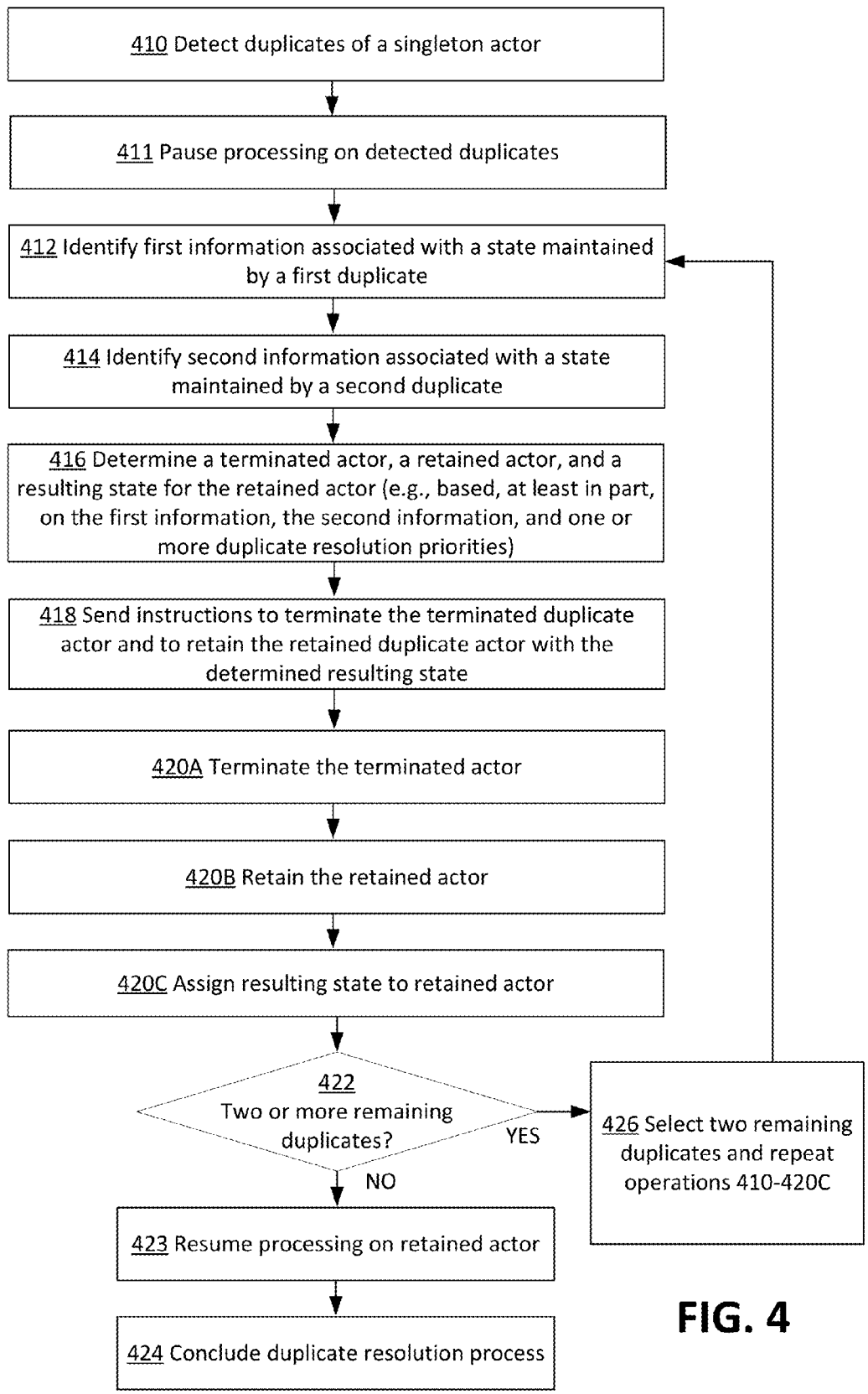
FIG. 4 is a flowchart illustrating an example duplicate resolution process for singleton actors that may be used in accordance with the present disclosure.

Thus, as described above, a number of different types of duplication, such as physical and logical duplication, may result in duplicates of singleton actors within an actor-based system. Some example singleton actor duplicate resolution techniques will now be described in detail. In particular, FIG. 4 is a flowchart illustrating an example duplicate resolution process for singleton actors that may be used in accordance with the present disclosure. The process of FIG. 4 begins at operation 410, at which duplicates of a singleton actor, such as physical and/or logical duplicates, are detected. In some examples, hubs 111A-D may employ a number of different techniques for detecting duplicates of singleton actors. For example, in some cases, duplicates of singleton actors may be detected based at least in part on actor identifiers of the duplicates, associated names and descriptions for the duplicates, and/or actor information stored in a registry associated with a hub. For example, as described above, hubs 111A-D may, in some cases, each have a respective registry that includes information associated with local actors executing on the respective hub as well as certain other remote actors executing on other hubs. As also described above, hubs 111A-D may also, from time to time, receive information for communicating with remote actors, for example via communications with other hubs and/or via an epidemic or other protocol for exchanging information across hubs. In some examples, a particular hub may receive information indicating that a singleton actor has been generated remotely on a different hub. Upon receiving such information, the particular hub may sometimes compare the information to information for singletons that are already currently stored in the hub's registry. In some examples, by comparing this information, the hub may determine that the remotely generated singleton identified in the received information has already been generated and executing locally on the hub. Thus, based on this comparison, the hub may determine that the local and remote instances of the singleton are duplicates of one another, and the hub may initiate a duplicate resolution process to merge the duplicates into a single remaining actor. In some examples, if the duplicates are physical duplicates, than the hub may identify the duplicates by determining that the local and remote instances have the same unique identifiers. By contrast, if the duplicates are logical duplicates, then the hub may identify the duplicates, for example, based on associated description of the instances or other indications that they perform similar functionality. As should be appreciated, the above-described registry-based duplicate identification techniques are merely one example duplicate detection technique and that many other duplicate detection techniques may be employed. For example, in some cases, one or more actors or other components, such as singleton coordinators 141A-D, may periodically monitor and check for duplicates, such as by periodically requesting or exchanging identifiers, descriptions, and/or other information associated with singleton actors.

To illustrate a specific example, consider a scenario in which hub 111B of FIG. 3 determines that singleton actor 132D is executing remotely on hub 111D and that hub 132D has the same unique identifier as hub 111B executing locally on hub 111B. Based on this information, hub 111B may determine that singleton actors 132B and 132D are duplicates of one another. In some cases, in this example, hub 111B may, for example based on information stored in its local registry, look-up and identify its local move coordinator, which is move coordinator 142B. Hub 111B may then send a duplicate resolution request to its local move coordinator 142B to resolve the identified singleton duplicates 132B and 132D.

At operation 411, processing, such as processing of incoming messages, may be paused on the duplicate actors detected at operation 410. Pausing of processing on the duplicate actors during performance of the duplicate resolution process may be advantageous by, for example, helping to ensure that a state of the singleton actor is not modified during the duplicate resolution process. As will be described below, upon conclusion of the duplicate resolution process, processing of incoming messages may be resumed by the retained duplicate actor. At operation 412, first information associated with a state maintained by a first duplicate singleton actor is identified. For example, upon receiving the duplicate resolution request from hub 111B, the local move coordinator 142B may then identify the first information associated with the state of the first duplicate (i.e., duplicate 132B), such as the current state value of duplicate 132B. To illustrate this concept, in some cases, singleton 132 may be an actor that maintains state information related to weapons available for use by a particular character in a video game. As a specific example, the current state of duplicate 132B may have a current state value of eight, indicating that the character has eight weapons that are currently available for use by the character in the video game. In addition to the current state value, other state-associated information for the first duplicate 132B may also be identified at operation 412, such as a time and/or sequence at which the state was most recently updated, a frequency with which the state has been updated over time, a quantity of times that the state has been updated, a time and/or sequence at which the first duplicate 132B was generated, and other information.

In some examples, move coordinator 142B may then, for example based on information stored in the local registry, look-up and identify the move coordinator for the remote hub 111D on which the remote duplicate 132D executes, which is move coordinator 142D. Move coordinator 142B may then issue a resolve duplicate request to the remote move coordinator 142D. The resolve duplicate request may include the first information associated with the state of duplicate 132B identified at operation 412 and may also identify the first duplicate 132B and the second duplicate 132D, such as by including their unique identifier, name, description, or other information. In some examples, upon receiving the resolve duplicate request from move coordinator 142B, move coordinator 142D may then forward the resolve duplicate request to the identified duplicate actor on its hub 111D, which in this example is duplicate 132D.

At operation 414, second information associated with a state maintained by a second duplicate singleton actor is identified. For example, upon receiving the resolve duplicate request from move coordinator 142D, duplicate 132D may identify the second information associated with the state of the second duplicate actor. In this example, duplicate 132D is the second duplicate actor, and, therefore, at operation 414, duplicate 132D may identify information associated with its own state. The information identified at operation 414 may include, for example, the current state value of duplicate 132D. As set forth above, to illustrate this concept, singleton 132 may be an actor that maintains state information related to weapons available for use by a particular character in a video game. As a specific example, the current state of duplicate 132D may have a current state value of six, indicating that the character has six weapons that are currently available for use by the character in the video game. It is noted that, in this example, the current state value of duplicate 132D (six) differs from the current state value of duplicate 132D (eight), which was identified previously at operation 412. In addition to the current state value, other state-associated information for the second duplicate 132D may also be identified at operation 414, such as a time and/or sequence at which the state was most recently updated, a frequency with which the state has been updated over time, a quantity of times that the state has been updated, a time and/or sequence at which the second duplicate 132D was generated, and other information.

At operation 416, a terminated actor, a retained actor, and a resulting state for the retained actor are determined. The terminated actor and the retained actor are determined from the first and the second duplicate actors such one of the first or the second duplicate actors is designated as the terminated actor, while the other (i.e., non-terminated) one of the first or the second duplicate actors is designated as the retained actor. In some examples, the terminated actor, the retained actor, and/or the resulting state for the retained actor may be determined based, at least in part, on the first information identified at operation 412, the second information identified at operation 414, and one or more duplicate resolution priorities. In some examples, the duplicate resolution priorities may include determining the retained actor and/or its resulting state based on factors such as a time, sequence, quantity, or frequency of updates of the states of the first and/or the second duplicates, the time or sequence of generation of the first and/or the second duplicates, state values of the first and/or the second duplicates, and other factors.

In some examples, it may be advantageous to employ a more simplistic duplicate resolution priority that may be easily implemented across a number of different duplicate resolution scenarios. Such a duplicate resolution priority may include, for example, a priority to retain the more recently generated duplicate and its respective current state value. For example, in the case of duplicates 132B and 132D, duplicate 132D is the more recently generated duplicate, as indicated by the dashed line surrounding duplicate 132D. Thus, in this example, duplicate 132D may be designated as the retained actor, while duplicate 132B may be designated as the terminated actor. Additionally, as set forth above, the current state value of duplicate 132D in this example is six, while the current state value of duplicate 132B in this example is eight. If a duplicate resolution priority is set to retain the current state value of the more recently generated duplicate, then the resulting state value of retained duplicate 132B will remain as six and will not be changed.

As should be appreciated, a number of other duplicate resolution priorities may also be employed. For example, in some cases, a duplicate resolution priority may be set to retain the less recently generated duplicate and its respective current state value. In this example, duplicate 132B may be designated as the retained actor and may retain its current state value of eight for its resulting state, while duplicate 132D may be designated as the terminated actor. As another example, a duplicate resolution priority may sometimes be set to retain a duplicate and/or a duplicate state that was updated more recently than the other duplicate. In some examples, this may be advantageous because the more recently updated duplicate may, in some cases, have a more accurate state value than the less recently updated duplicate. As another example, a duplicate resolution priority may sometimes be set to retain a duplicate and/or a duplicate state has been updated more often and/or more frequently than the other duplicate. In some examples, this may be advantageous because the duplicate that is updated more often and/or more frequently may, in some cases, have a more accurate state value than the less often and/or less frequently updated duplicate. As yet another example, in some cases, the terminated actor, the retained actor, and/or the resulting state may be selected at random.

Thus, some duplicate resolution priorities, such as those described above, may sometimes be advantageous, for example, because they may allow duplicate resolution to be performed in a less complex and easily enforceable manner. In some cases, however, it may be advantageous to employ a more value-based duplicate resolution priority, such as by evaluating the values of the current states of the different duplicates. For example, a value-based duplicate resolution priority may sometimes be employed for examples in which the value of the resulting singleton state is likely to have a more substantial impact on the perceived quality or level enjoyment of the product for which the actor-based system is implemented. For example, if the actor-based system is being implemented to produce a video game, and if the resulting singleton state value is likely to have more substantial impact on a player's enjoyment of the game, then it may sometimes be advantageous to employ a value-based duplicate resolution priority, which may sometimes help to ensure that the resulting singleton state value is more acceptable to the player. Thus, while value-based duplicate resolution priorities may sometimes be more complicated to enforce, they may nevertheless be advantageous in certain scenarios.

One particular example of a value-based duplicate resolution priority is to compare the current state values of the two duplicates and to select the higher duplicate state value to be the resulting state value. In particular, for the example described above in which the current state value for duplicate 132B is eight and the current state value for duplicate 132D is six, the higher state value of eight may be selected as the resulting state value for the retained actor. As set forth above, in this example, duplicates 132B and 132D maintain a state value representing a number of weapons that are available for use by a player in a video game. In some cases, if a number of weapons available to a player were to suddenly be reduced, for example from eight weapons to six weapons, the player may notice this fairly quickly and this may cause the player to become upset and dissatisfied with the video game experience. By contrast, if the player were to suddenly be rewarded with extra weapons (which may sometimes occur when the higher state value is retained), the player may not be bothered by receiving additional weapons, since this will typically not negatively impact the player's gaming experience. Thus, for situations such as these, it may sometimes be advantageous to select the higher duplicate state value, which may result in giving the player the benefit of the doubt and erring on the side of possibly giving the player extra weapons as opposed to improperly removing weapons from the player.

By contrast, in some examples, a value-based duplicate resolution priority may sometimes be set to compare the current state values of the two duplicates and to select the lower duplicate state value to be the resulting state value. For example, consider a scenario in which the duplicate actors maintain a state value representing a number of enemy combatants with which a character is engaged in battle. In some cases, if a number of enemy combatants were to suddenly be increased, then this may irritate or upset the player by suddenly increasing a difficulty level for winning the battle. By contrast, if the number of enemy combatants were to suddenly be decreased, then this will typically not negatively impact the player's gaming experience since it may result in the battle being less difficult for the player to win. Thus, for situations such as these, it may sometimes make sense to select the lower duplicate state value. It is noted that the above described higher and lower selection priorities merely constitute some example value-based duplicate resolution priorities and that many other value-based duplicate resolution priorities may be employed. For example, in some cases, the resulting value for the retained actor may be selected based on an average or weighted average of the current duplicate state values or based on some other function or combination of state values or other attributes.

It is further noted that there is no requirement that the same or similar duplicate resolution priorities must be employed for all singleton actors in the actor-based system 100. In some examples, different duplicate resolution priorities may be employed for different types of singleton actors. For example, in some cases, some singleton actors in the actor-based system 100 may have duplicates resolved based on priorities such as a time, sequence, quantity, or frequency of state updates, while other singleton actors in the actor-based system 100 may have duplicates resolved based on priorities such as value-based priorities. In some examples, one or more default duplicate resolution priorities may be applied to some singleton actors, while other singleton actors may be removed or opted-out from the default priorities and may be assigned with custom duplicate resolution priorities. For example, in some cases, a time, sequence, quantity, or frequency of state updates may be default duplicate resolution priorities, while custom duplicate resolution priorities may include value-based priorities such as those described above.

Figure 5:
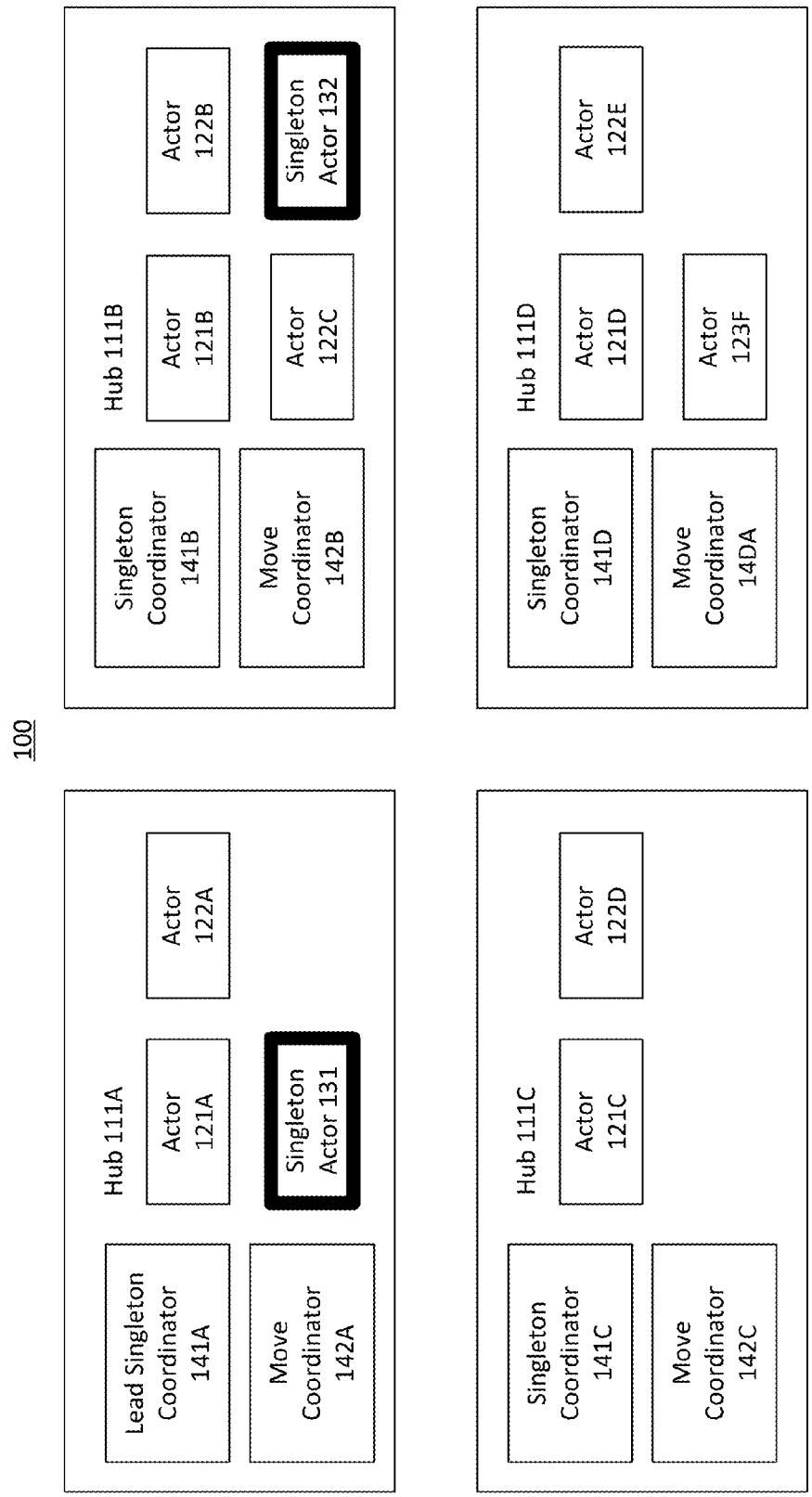
FIG. 5 is a diagram illustrating example actor-based system with singleton actors after duplicate resolution that may be used in accordance with the present disclosure.

Referring now to FIG. 5, an example of the actor-based system 100 after performance of a duplicate resolution process is shown. In the particular example of FIG. 5, it is seen that singleton actor 132B on hub 111B is selected as the terminated actor, while singleton actor 132D on hub 111D is selected as the retained actor. This is indicated in FIG. 5 by the termination of singleton actor 132B from hub 111B, and the retention of singleton actor 132 on hub 111D. It is noted that, in FIG. 5, the reference number for singleton actor 132 on hub 111D is changed from reference number 132D (as shown in FIG. 3) to reference number 132 to indicate that the singleton actor 132 in FIG. 5 is no longer a duplicate.

Additionally, in the particular example of FIG. 5, it is seen that singleton actor 131C on hub 111C is selected as the terminated actor, while singleton actor 131A on hub 111A is selected as the retained actor. This is indicated in FIG. 5 by the deletion of singleton actor 131C from hub 111C, and the retention of singleton actor 131 on hub 111A. It is noted that, in FIG. 5, the reference number for singleton actor 131 on hub 111A is changed from reference number 131A (as shown in FIG. 3) to reference number 131 to indicate that the singleton actor 131 in FIG. 5 is no longer a duplicate.

Thus, as described above, a terminated actor, a retained actor, and a resulting state for the retained actor are determined at operation 416. Referring back to FIG. 4, at operation 418, instructions are sent to terminate the terminated actor and to retain the retained actor with the determined resulting state. In particular, for the example of duplicate resolution of singleton 132 shown in FIG. 5, instructions may be sent to terminate the terminated actor 132B, and to retain the retained actor 132D. As set forth above, the actor and state retention and termination determinations made at operation 416 may, in some examples, be made by one or both of the duplicate singleton actors themselves, such as duplicate 132B and/or duplicate 132D. Thus, in some examples, duplicate 132D may send the actor termination and retention instructions at operation 416. In particular, at operation 416, duplicate 132D may send instructions to its local move coordinator (i.e., move coordinator 142D) indicating that actor 132B is to be terminated and that actor 132D is to be retained. These instructions may then be forwarded, if necessary, to the move coordinator that is local to the terminated actor, which, in this example, is move coordinator 142B.

At operation 420A, the terminated actor is terminated. At operation 420B, the retained actor is retained, and, at operation 420C, the determined resulting state is assigned to the retained actor. In some examples, operations 420A-C may be performed using an actor merge operation. In particular, continuing with the above example for singleton actor 132, the move coordinator 142B for the terminated duplicate actor 132B may, in some cases, initiate a merge operation to merge terminated actor 132B into retained actor 132D. In some examples, move coordinator 142B may perform this merge operation via communications with the move coordinator local to the retained actor, which in this example is move coordinator 142D. Additionally, in some examples, as part of the merge operation, move coordinator 142D may terminate the terminated actor 132B by merging the terminated actor 132B into the retained duplicate actor 132D, which may be retained by continuing to execute subsequent to the merge operation as singleton actor 132 of FIG. 5. Furthermore, as part of the merge operation, the state of the retained actor 132D is assigned to be the resulting state determined at operation 416 and described in detail above.

At operation 422, it is determined whether there are still two or more remaining duplicates of the same singleton actor for which first and second duplicate were resolved using operations 410-420. If there no longer are two or more remaining duplicates, then the duplicate resolution process may proceed to operation 423, at which processing, such as processing of incoming messages, is resumed on the retained actor. As set forth above, in some examples, upon initiation of the duplicate resolution process, processing may be paused on the detected duplicate actors (e.g., at operation 411), for example to help ensure that a state of the singleton actor is not modified during the duplicate resolution process. The duplicate resolution process then concludes at operation 424. By contrast, if, at operation 422, it is determined that there are still at least two or more remaining duplicates, then, at operation 426, two of the remaining duplicates may be selected and resolved by repeating operations 410-420C. This loop may be repeated until there are no remaining duplicates and there is only one retained actor for the singleton. As a specific example, in some cases, if a third duplicate for singleton actor 132 executing were to be detected, operations 410-420C may be repeated by substituting the retained actor 132B and the third duplicate actor for the first duplicate actor and the second duplicate actor.

In the examples described above, the determinations performed at operation 416 (e.g., terminated actor, retained actor, resulting state, etc.) are described as being performed by one of the duplicate actors, such as duplicate singleton actor 132D. In some cases, this may be advantageous by, for example, improving efficiency, for example because the duplicate actor may efficiently access and evaluate information related to its own state. It is noted, however, that there is no requirement that these determinations must be performed by one or both of the duplicate actors, and may instead be performed by one or more other actors, units, or components, including for example, singleton coordinators 141A-D, move coordinators 142A-D, or any other actors, units, or components.

It is further noted that, in some examples, a determination may be made to restart the actor-based system 100 as opposed to attempting resolve all duplicates of a singleton. For example, in some cases, when there is a very large quantity of duplicates of a singleton, it may sometimes be more efficient to restart the actor-based system 100 than to attempt to resolve all duplicates of the singleton.

Thus, techniques such as those described above may be employed to resolve duplicates of singleton actors within actor-based system 100. While improper duplication is one problem that may sometimes affect singleton actors, another contrasting problem that may sometimes affect singleton actors may occur when a single instance of a singleton actor is undesirably terminated, resulting in a condition in which no executing instances of the singleton remain operational. This may occur, for example, when the hub on which the singleton actor executes is terminated or when the singleton actor itself is terminated while its hub continues to execute. One example technique for alleviating the possibility of an undesirably terminated singleton involves the use of singleton coordinators 141A-D, which will now be described in detail.

Referring back to FIG. 5, it is seen that singleton coordinator 141A executing on hub 111A is a lead singleton coordinator that leads the group of singleton coordinators 141A-D executing respectively on hubs 111A-D. As set forth above, lead singleton coordinator 141A may perform a leadership and/or supervisory role in any or all operations performed by singleton coordinators 141A-D, such as generation of singleton actors, hub selection for singleton actors, duplicate detection and resolution for singleton actors, monitoring and detection of terminated singleton actors, re-generation of singleton actors, and others.

A number of techniques may be employed for selecting and designating a lead singleton coordinator, such as determining a lead singleton coordinator based on acquisition of a singleton coordinator database lock. For example, in some cases, each singleton coordinator 141A-D may periodically attempt to acquire a singleton coordinator database lock. In this example, an initial lead singleton coordinator may be the first singleton coordinator to successfully acquire the singleton coordinator database lock. However, if the hub on which the initial lead singleton coordinator executes were to terminate, then the initial lead singleton coordinator would, in turn, terminate and release its singleton coordinator database lock. One of the other singleton coordinators may then successfully complete its next attempt to acquire the singleton coordinator database lock, and may, in turn, become the next lead singleton coordinator. It is noted that the use of a database lock is merely one example technique for selecting a lead singleton coordinator and then other techniques may be employed. For example, in some cases, the lead singleton coordinator may be elected by the group of singleton coordinators. In other examples, multiple lead singleton coordinators may cooperate to perform singleton coordination leadership. In yet other examples, a singleton coordinator other than the lead singleton coordinator may be designated as a supervisor that may select a new lead singleton coordinator upon termination of a prior lead singleton coordinator.

Figure 6:
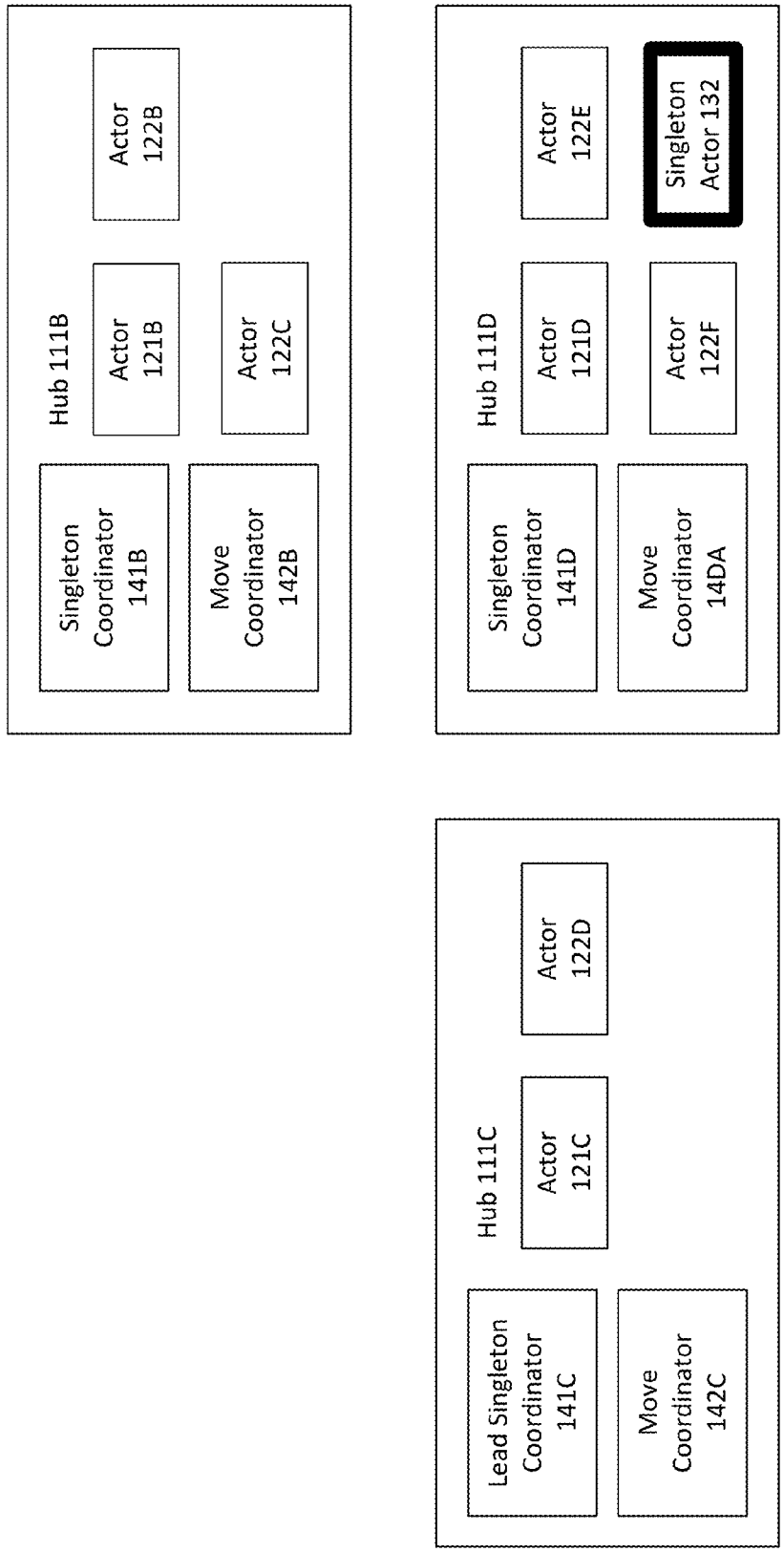
FIG. 6 is a diagram illustrating example actor-based system with a re-designated lead singleton coordinator that may be used in accordance with the present disclosure.

Referring now to FIG. 6, it is seen that hub 111A of FIG. 5 has been terminated, as indicated by hub 111A being omitted from FIG. 6. Additionally, as a result of the termination of hub 111A in FIG. 6, lead singleton coordinator 141A, which formerly executed on hub 111A in FIG. 5, has also been terminated. However, as shown in FIG. 6, a new lead singleton coordinator has been selected, which is lead singleton coordinator 141C on hub 111C. In some examples, new lead singleton coordinator 141C may be designated as lead singleton coordinator after it has been determined that the prior lead singleton coordinator 141A has been terminated. In some cases, lead singleton coordinator 141C may acquire its designation as lead singleton coordinator by, for example, acquiring the singleton coordinator database lock or using any of the other above-described or other leader selection techniques.

Figure 7:
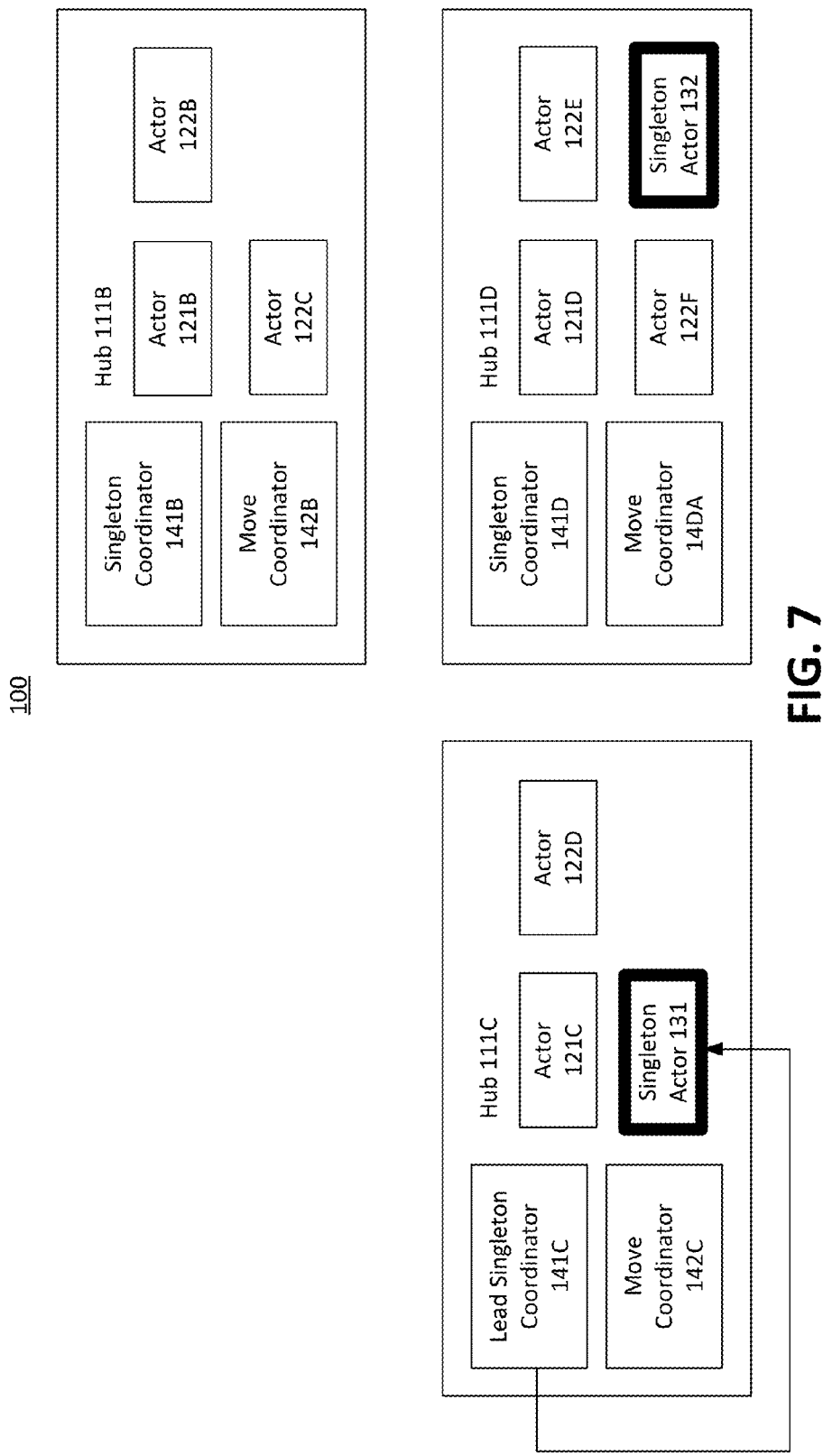
FIG. 7 is a diagram illustrating example actor-based system with a re-generated singleton that may be used in accordance with the present disclosure.

Another result of the termination of hub 111A is that singleton actor 131, which formerly executed on hub 111A in FIG. 5, has also been terminated. As set forth above, this may be problematic because there are no other remaining instances of singleton actor 131 remaining in actor-based system 100. However, by selecting a new lead singleton coordinator 141C on hub 111C, actor-based system 100 may allow the terminated singleton actor 131 to be re-generated on another hub. In particular, some of the operations performed by lead singleton coordinator 141C may include monitoring the actor-based system 100 to detect terminated singletons and selecting a hub on which to re-generate the terminated singletons. Thus, lead singleton coordinator 141C may detect that singleton actor 131 has been terminated, may select a new hub on which to re-generate singleton actor 131, and may then issue instructions for the selected hub to re-generate singleton actor 131. Referring now to FIG. 7, it is seen that lead singleton coordinator 141C has issued instructions to re-generate singleton actor 131 on hub 111C, as indicated by the arrow in FIG. 7 pointing from lead singleton coordinator 141C to re-generated singleton actor 131. Thus, as set forth above, the ability to select and designate new lead singleton coordinators may be advantageous by, for example, allowing singleton actors terminating along with or subsequent to a prior lead singleton coordinator to be detected and re-generated.

In addition to the ability to re-generate terminated singleton actors, the singleton coordinator framework described herein may provide additional advantages, such as the ability to generate new singleton actors after launch of the actor-based system. In particular, in some examples, singleton actors generated during launch of the actor-based system 100 may sometimes be generated on a selected hub, such as a first hub to initiate execution within the actor-based system 100. This may sometimes provide a simple and easy to implement rule for generating of singletons. However, this rule may sometimes become problematic when new singletons are generated after system launch and after the original selected hub has been terminated. In this scenario, because the original selected hub has been terminated, it may sometimes be impossible to generate a new singleton without restarting the actor-based system 100. It is noted, however, that by allowing new lead singleton coordinators to be designated after termination of prior lead singleton coordinators, the singleton coordination framework described herein may help to ensure that a lead singleton coordinator will continually be available to handle generation of new singletons after launch of the actor-based system 100. In particular, in some examples, the lead singleton coordinator may serve to select a hub on which to generate a new singleton and to issue instructions for generating the new singleton on the selected hub.

Figure 8:
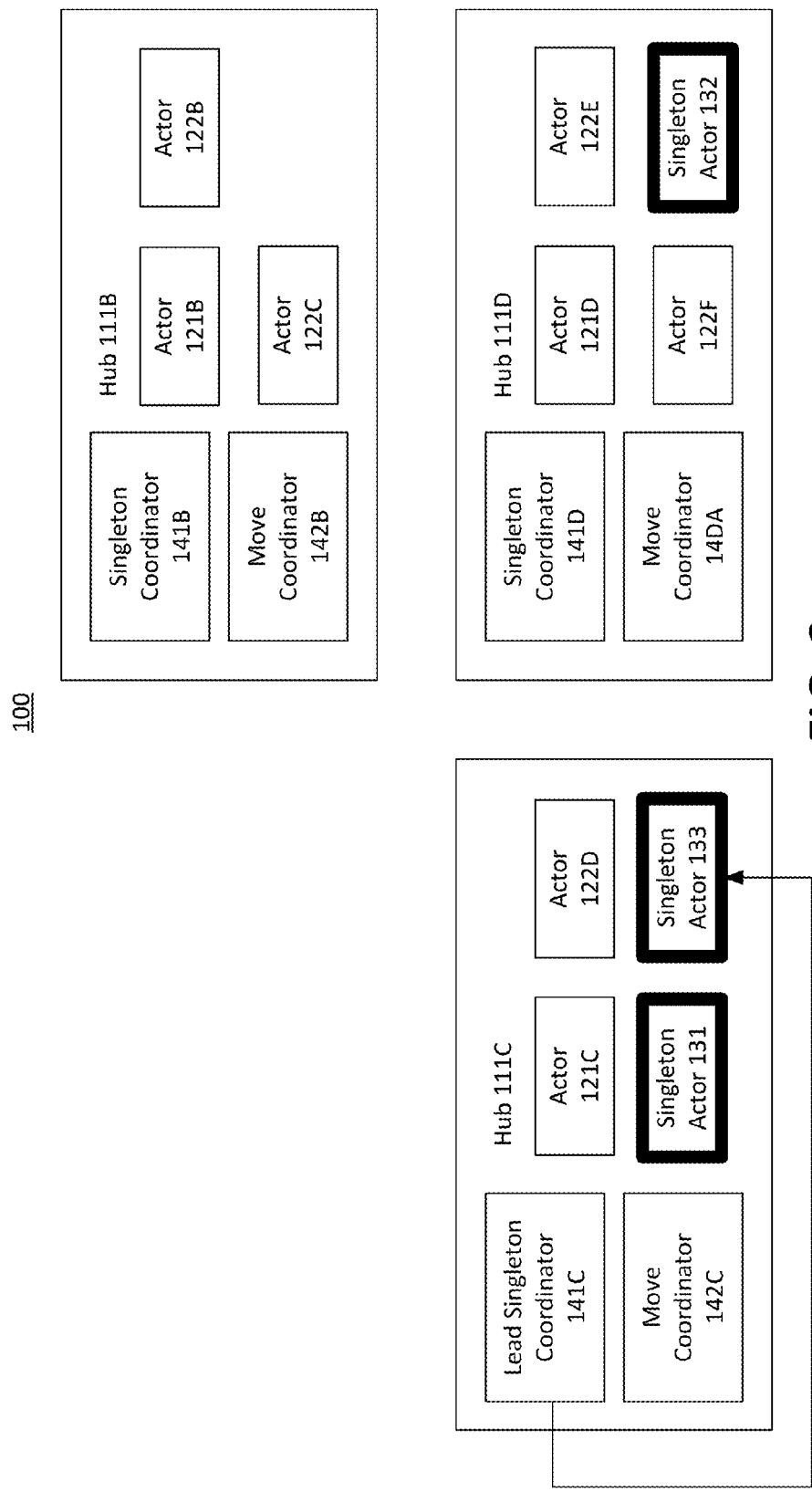
FIG. 8 is a diagram illustrating example actor-based system with a singleton generated after system launch that may be used in accordance with the present disclosure.

For example, referring now to FIG. 8, it is seen that singleton actor 133 is generated on hub 111C by lead singleton coordinator 141C, as indicated by the arrow pointing from lead singleton coordinator 141C to singleton actor 133. It is noted that singleton actor 133 is a newly generated singleton actor that is generated after launch of the actor-based system 100, for example as indicated by singleton actor 133 not being included in prior FIG. 7. Moreover, in this example, it is noted that the assumption of singleton coordinator 141C as the lead singleton coordinator allows the singleton 133 to be generated even after termination of the prior lead singleton coordinator (i.e., former lead singleton coordinator 141A on former hub 111A).

Figure 9:
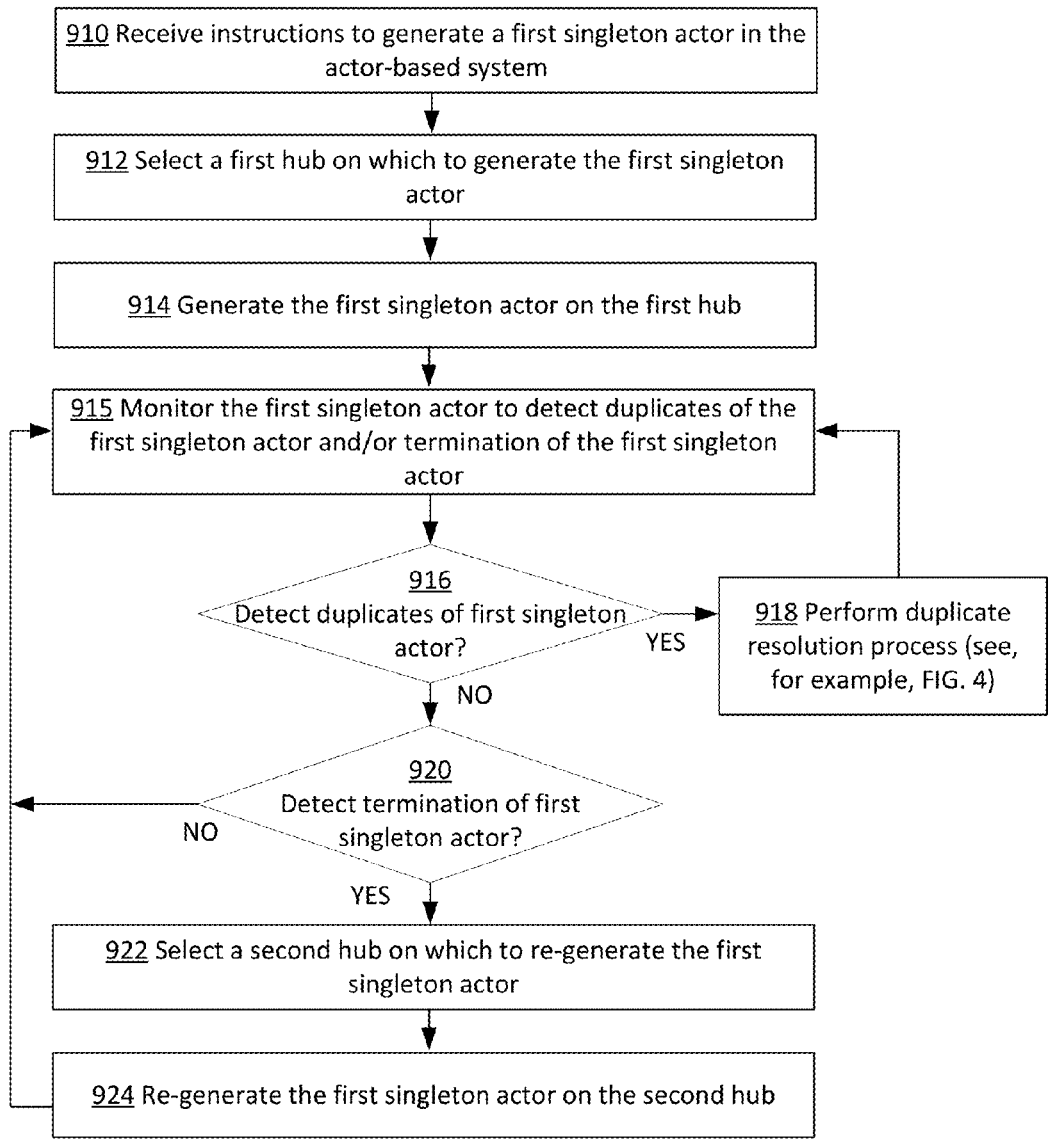
FIG. 9 is a flowchart illustrating an example process for singleton coordination in an actor-based system that may be used in accordance with the present disclosure.

FIG. 9 is a flowchart illustrating an example process for singleton coordination in an actor-based system that may be used in accordance with the present disclosure. As set forth above, an actor-based system may include multiple actors executing on multiple different hubs. In some examples, each hub in the actor-based system may have a respective singleton coordinator, one of which is designated as a lead singleton coordinator.

The process of FIG. 9 is initiated at operation 910, at which instructions are received to generate a first singleton actor in the actor-based system. As set forth above, a singleton actor is permitted to have only a single associated instance in an actor-based system. Thus, in some examples, functionality associated with a singleton actor may be performed by only a single executing instance within the actor-based system. As set forth above, in some examples, instructions to generate the first singleton actor may be received before or during launch of the actor-based system, while, in other examples, instructions to generate the first singleton actor may be received after launch of the actor-based system. In some examples, a hub may issue instructions to generate the first singleton actor, and the instructions may be received by a local singleton coordinator executing on the issuing hub. If the local singleton coordinator is not the lead singleton coordinator, then the local singleton coordinator may then forward the instructions to the lead singleton coordinator. In some examples, multiple hubs may issue, in close time proximity to one another, instructions to generate an identical singleton. In such cases, the lead singleton coordinator may receive both requests but may generate the requested singleton only once.

At operation 912, a first hub on which to generate the first singleton actor is selected. As set forth above, in some examples, the first hub may be selected by the lead singleton coordinator. Also, in some examples, the first hub may be selected based, at least in part, on the first hub being a first hub to initiate its execution within the actor-based system. Furthermore, in some examples, the first hub may be selected based, at least in part, on the first hub being the hub on which the lead singleton coordinator executes.

At operation 914, the first singleton actor is generated on the first hub. In some examples, the first singleton actor may be generated by the lead singleton coordinator. In some examples, upon generation of the first singleton actor, the lead singleton coordinator may provide, for example to a hub that requested generation of the first singleton actor and/or other hubs or actors, reference information for communicating with the first singleton actor.

At operation 915, the first singleton actor is monitored to detect duplicates of the first singleton actor or termination of the first singleton actor. The monitoring and detecting of duplicates of singleton actors is described in detail above. For example, monitoring techniques are described above, such as with respect to FIG. 4, in which hubs may receive information regarding a singleton actor on a remote hub and compare such information against singleton actors identified in their own local registries to identify duplicates. Other duplicate monitoring and detection techniques are described in detail above and are not repeated here.

Additionally, singleton actors may also be monitored to detect termination of a singleton, which refers to a condition in which no instance of the singleton remains executing in the actor-based system and/or on the plurality of hubs or nodes within the actor-based system. In some examples, singletons may be monitored to detect termination by the lead singleton coordinator, one or more other singleton coordinators, one or more hubs, and/or other components. For example, in some cases, a singleton actor may be periodically pinged or otherwise contacted, for example by a singleton coordinator and/or other component, to confirm that an instance of the singleton actor remains executing in the actor-based system. Also, in some examples, a singleton actor may be required to periodically contact a singleton coordinator and/or other component in order to confirm that an instance of the singleton actor remains executing in the actor-based system. Any combination of these or other monitoring techniques may be employed.

At operation 916, it is determined whether duplicates of the first singleton actor are detected. A number of examples techniques for detection of duplicates of a singleton actor are described in detail above, for example with respect to operation 410 of FIG. 4, and are not repeated here. If duplicates of the first singleton actor are detected, then, at operation 918, a duplicate resolution process is performed such that no more than one executing instance of the first singleton actor is retained in the actor-based system. Some example duplicate resolution techniques are described in detail above, for example with FIG. 4, and are not repeated here.

At operation 920, it is determined whether termination of the first singleton actor is detected. As set forth above, termination of the first singleton actor may occur when no instance of the first singleton actor remains executing in the actor-based system and/or on the plurality of hubs or nodes within the actor-based system. Termination of the first singleton actor may be detected, for example, based on termination monitoring techniques such as those described above. In some examples, termination of the first singleton actor may be detected by a lead singleton coordinator and/or other component. In some examples, termination of the first singleton actor may occur when a hub on which the first singleton actor executes is terminated, such as depicted in the example of FIG. 6 and described above. Also, in some examples, if a terminated hub includes the lead singleton coordinator, then a new lead singleton coordinator may be designated on another remaining hub, such as also depicted above in FIG. 6.

At operation 922, a second hub on which to re-generated the first singleton actor is selected. As set forth above, in some examples, the second hub may be selected by the lead singleton coordinator. Also, in some examples, the second hub may be selected based, at least in part, on the second hub being the hub on which the lead singleton coordinator executes. In some examples, such as when termination of the first hub results in termination of the first singleton actor, the second hub may be a different hub than the first hub. It is noted, however, that the second hub is not necessarily required to be different from the first hub and, in some cases, might be the same as the first hub, which may result in the first singleton actor being re-generated on the same hub on which it formerly executed prior to termination.

At operation 924, the singleton actor is re-generated on the second hub. In some examples, the first singleton actor may be re-generated by the lead singleton coordinator. In some examples, upon re-generation of the first singleton actor, the lead singleton coordinator may provide, for example to various hubs and/or actors, reference information for communicating with the re-generated first singleton actor. The process then returns to operation 915.

In some examples, in order to efficiently assign a state to a regenerated singleton actor, replicas or other backups of the states of singleton actors may sometimes be maintained. For example, in some cases, a current state value of a singleton actor may be stored in a database or other storage location and periodically updated as the singleton actor continues to execute. Then, if the singleton actor is terminated and regenerated, the most recently updated state value may be retrieved from the storage location and assigned to the regenerated singleton actor. As another example, in some cases, one or more replicas, such as read-only replicas, of a singleton actor may be maintained throughout the actor based system. These replicas may receive updates of the singleton actor's state when the singleton actor's state is modified. Then, if the singleton actor is terminated and regenerated, the most recently updated state value may be retrieved from one or more of the replicas and assigned to the regenerated singleton actor. In some examples, a replica of a singleton actor may execute on at least one hub in the actor based system other than the hub on which the respective singleton actor executes. Thus, in some examples, a backup state of a singleton actor may be stored and updated in a database record and/or a replica of the singleton actor, and the backup state may be assigned to the singleton actor when the singleton actor is regenerated.

Figure 10:
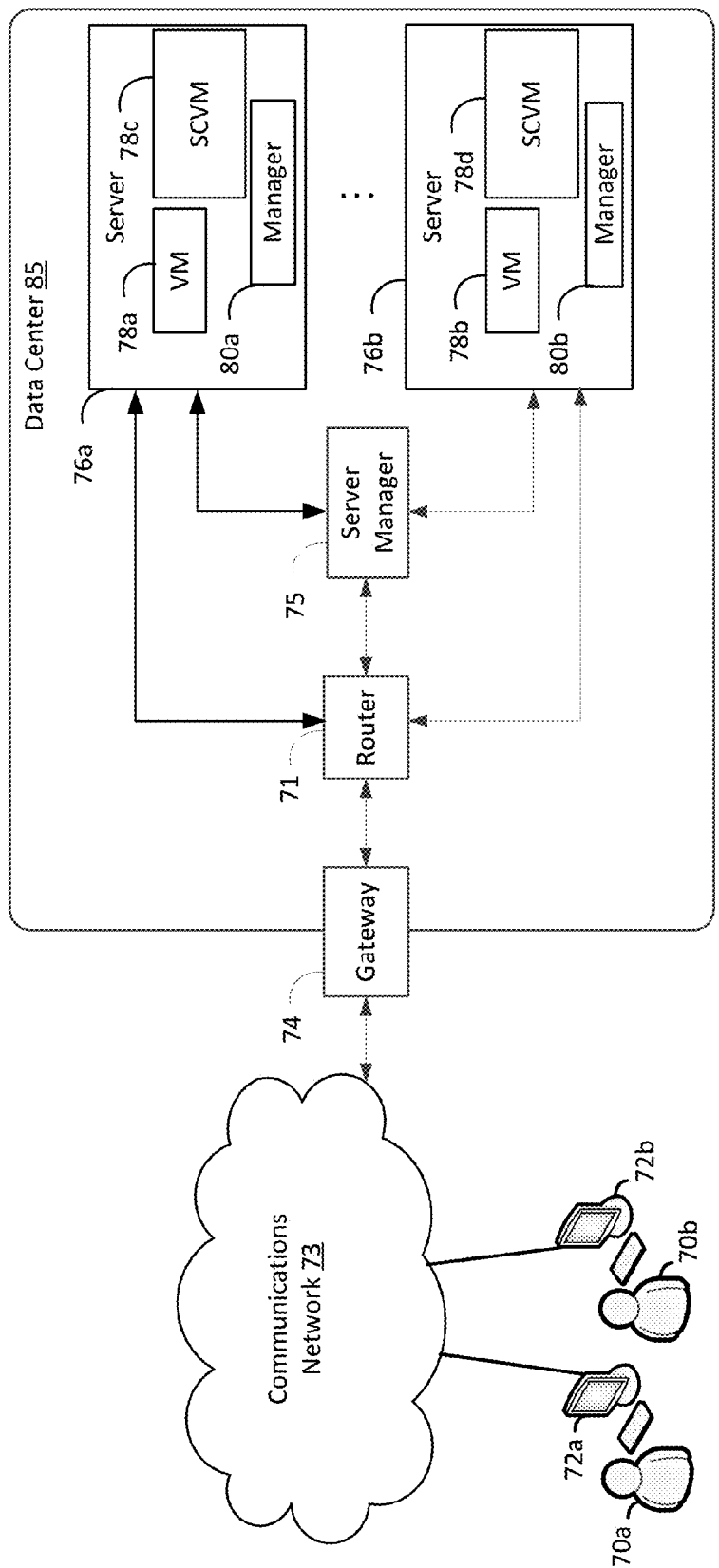
FIG. 10 is a diagram illustrating an example system for transmitting and providing data that may be used in accordance with the present disclosure.

An example system for transmitting and providing data, such as data associated with one or more actors, will now be described in detail. In particular, FIG. 10 illustrates an example computing environment in which the embodiments described herein may be implemented. FIG. 10 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are singleton coordination virtual machine ("SCVM") instances. The SCVM virtual machine instances 78c and 78d may be configured to perform all, or any portion, of the singleton coordination techniques and/or any other of the disclosed techniques in accordance with the present disclosure and described in detail above. As should be appreciated, while the particular example illustrated in FIG. 10 includes one SCVM virtual machine in each server, this is merely an example. A server may include more than one SCVM virtual machine or may not include any SCVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
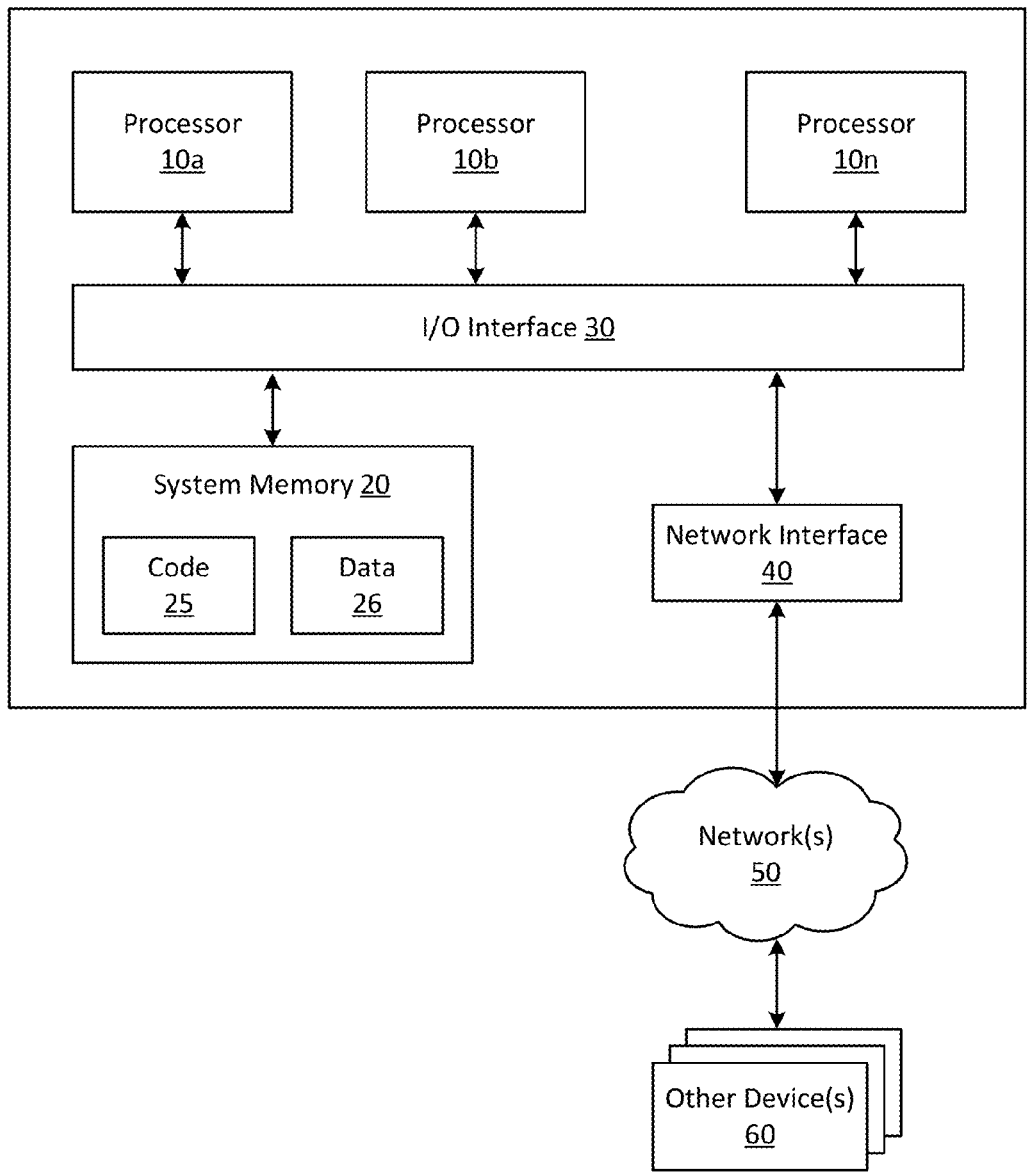
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for actor duplicate resolution comprising:
   one or more processors; and
   one or more memories having stored therein instructions that, upon execution by the one or more processors, cause the computing system to perform operations comprising:
      detecting duplicate actors of a first singleton actor of a plurality of actors in an actor-based system, wherein the plurality of actors execute on a plurality of hubs comprising a first hub and a second hub, wherein the duplicate actors comprise a first duplicate actor executing on the first hub and a second duplicate actor executing on the second hub;
      identifying first information associated with a first state maintained by the first duplicate actor and second information associated with a second state maintained by the second duplicate actor;
      determining, by at least one of the first or the second duplicate actor, based at least in part on the first information, the second information, and one or more duplicate resolution priorities, a retained actor and a terminated actor from the first and the second duplicate actors, and a resulting state for the retained actor terminating the terminated actor;
retaining the retained actor; and
assigning the resulting state to the retained actor.

2. The computing system of claim 1, wherein the one or more duplicate resolution priorities comprise determining the resulting state based, at least in part, on a state value of at least one of the first state or the second state.

3. The computing system of claim 1, wherein the duplicate actors further comprise a third duplicate actor, and wherein the operations further comprise repeating the identifying, the determining, the terminating, the retaining, and the assigning by substituting the retained actor and the third duplicate actor for the first duplicate actor and the second duplicate actor.

4. The computing system of claim 1, wherein the detecting comprises detecting the duplicate actors based at least in part on actor information stored in a registry associated with the first hub.

5. A method for actor duplicate resolution comprising:
detecting duplicate actors of a first actor of a plurality of actors in an actor-based system, wherein the plurality of actors execute on a plurality of nodes comprising a first node and a second node, wherein the duplicate actors comprise a first duplicate actor executing on the first node and a second duplicate actor executing on the second node;
identifying first information associated with a first state maintained by the first duplicate actor and second information associated with a second state maintained by the second duplicate actor;
determining, based at least in part on the first information, the second information, and one or more duplicate resolution priorities, a retained actor and a terminated actor from the first and the second duplicate actors, and a resulting state for the retained actor;
terminating the terminated actor;
retaining the retained actor; and
assigning the resulting state to the retained actor.

6. The method of claim 5, wherein the one or more duplicate resolution priorities comprise determining the resulting state based, at least in part, on a state value of at least one of the first state or the second state.

7. The method of claim 5, wherein the duplicate actors further comprise a third duplicate actor, and wherein the method further comprises repeating the identifying, the determining, the terminating, the retaining, and the assigning by substituting the retained actor and the third duplicate actor for the first duplicate actor and the second duplicate actor.

8. The method of claim 5, wherein the detecting comprises detecting the duplicate actors based at least in part on actor information stored in a registry associated with the first node.

9. The method of claim 5, wherein the detecting comprises detecting the duplicate actors based at least in part on an identifier of the first duplicate actor and the second duplicate actor.

10. The method of claim 5, wherein the determining is performed by at least one of the first duplicate actor or the second duplicate actor.

11. The method of claim 5, wherein the one or more duplicate resolution priorities comprise determining the resulting state based, at least in part, on time, sequence, quantity, or frequency of updates of at least one of the first state or the second state.

12. The method of claim 5, wherein the one or more duplicate resolution priorities comprise determining the resulting state based, at least in part, on time or sequence of generation of at least one of the first duplicate actor or the second duplicate actor.

13. One or more non-transitory computer-readable storage media having stored thereon instructions that, upon execution by one or more computing devices, cause the one or more compute nodes to perform operations comprising:
detecting duplicate actors of a first actor of a plurality of actors in an actor-based system, wherein the plurality of actors execute on a plurality of nodes comprising a first node and a second node, wherein the duplicate actors comprise a first duplicate actor executing on the first node and a second duplicate actor executing on the second node;
identifying first information associated with a first state maintained by the first duplicate actor and second information associated with a second state maintained by the second duplicate actor;
determining, based at least in part on the first information, the second information, and one or more duplicate resolution priorities, a retained actor and a terminated actor from the first and the second duplicate actors, and a resulting state for the retained actor;
terminating the terminated actor;
retaining the retained actor; and
assigning the resulting state to the retained actor.

14. The one or more non-transitory computer-readable storage media of claim 13, wherein the one or more duplicate resolution priorities comprise determining the resulting state based, at least in part, on a state value of at least one of the first state or the second state.

15. The one or more non-transitory computer-readable storage media of claim 13, wherein the duplicate actors further comprise a third duplicate actor, and wherein the operations further comprise repeating the identifying, the determining, the terminating, the retaining, and the assigning by substituting the retained actor and the third duplicate actor for the first duplicate actor and the second duplicate actor.

16. The one or more non-transitory computer-readable storage media of claim 13, wherein the detecting comprises detecting the duplicate actors based at least in part on actor information stored in a registry associated with the first node.

17. The one or more non-transitory computer-readable storage media of claim 13, wherein the detecting comprises detecting the duplicate actors based at least in part on an identifier of the first duplicate actor and the second duplicate actor.

18. The one or more non-transitory computer-readable storage media of claim 13, wherein the determining is performed by at least one of the first duplicate actor or the second duplicate actor.

19. The one or more non-transitory computer-readable storage media of claim 13, wherein the one or more duplicate resolution priorities comprise determining the resulting state based, at least in part, on time, sequence, quantity, or frequency of updates of at least one of the first state or the second state.

20. The one or more non-transitory computer-readable storage media of claim 13, wherein the one or more duplicate resolution priorities comprise determining the resulting state based, at least in part, on time or sequence of generation of at least one of the first duplicate actor or the second duplicate actor.

* * * * *